(12) United States Patent
Ye et al.

(10) Patent No.: US 12,507,257 B2
(45) Date of Patent: *Dec. 23, 2025

(54) CONFIGURED GRANT OPERATIONS FOR MULTIPLE PUSCH

(71) Applicant: Apple Inc., Cupertino, CA (US)

(72) Inventors: Chunxuan Ye, San Diego, CA (US); Chunhai Yao, Beijing (CN); Dawei Zhang, Saratoga, CA (US); Haitong Sun, Saratoga, CA (US); Hong He, San Jose, CA (US); Oghenekome Oteri, San Diego, CA (US); Seyed Ali Akbar Fakoorian, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/466,451

(22) Filed: Sep. 13, 2023

(65) Prior Publication Data

US 2023/0422273 A1    Dec. 28, 2023

Related U.S. Application Data

(63) Continuation of application No. 17/759,669, filed as application No. PCT/CN2021/111052 on Aug. 5, 2021.

(51) Int. Cl.
*H04W 72/232* (2023.01)
*H04L 1/1822* (2023.01)
(Continued)

(52) U.S. Cl.
CPC ......... *H04W 72/232* (2023.01); *H04L 1/1822* (2013.01); *H04W 72/11* (2023.01); *H04W 72/1273* (2013.01)

(58) Field of Classification Search
CPC ............... H04W 72/232; H04W 72/11; H04W 72/1273; H04L 1/1822
See application file for complete search history.

(56) References Cited

U.S. PATENT DOCUMENTS

| 12,034,662 B2 * | 7/2024 | Zhang ................... H04W 72/23 |
| 2016/0174259 A1 * | 6/2016 | Mukherjee ................ H04L 1/08 370/280 |

(Continued)

*Primary Examiner* — James P Duffy
(74) *Attorney, Agent, or Firm* — Fay Kaplun & Marcin, LLP (57) ABSTRACT

A user equipment (UE) is configured to receive from a base station a semi-persistent scheduling (SPS) configuration for physical downlink shared channel (PDSCH) transmissions wherein multiple PDSCHs are transmitted within a single period of the SPS, the SPS configuration including a parameter for a number of hybrid automatic repeat request (HARQ) processes associated with the SPS configuration, receive from the base station a downlink control information (DCI) transmission for activating the SPS configuration, the DCI including a HARQ process ID for one of the PDSCH transmissions in the SPS configuration, wherein the UE determines a maximum number of PDSCH transmissions allowed within the single period based on the parameter for the number of HARQ processes associated with the SPS configuration, validate the DCI to determine time domain resources to use for the PDSCH transmission and receive from the base station the multiple PDSCH transmissions within the single SPS period.

18 Claims, 6 Drawing Sheets

(51) Int. Cl.
  *H04W 72/11* (2023.01)
  *H04W 72/1273* (2023.01)

(56) References Cited

U.S. PATENT DOCUMENTS

| | | | |
|---|---|---|---|
| 2020/0404632 A1* | 12/2020 | Zhou | H04W 72/23 |
| 2021/0218504 A1* | 7/2021 | Wang | H04L 1/1812 |
| 2021/0378006 A1* | 12/2021 | Takeda | H04W 52/04 |
| 2022/0256543 A1* | 8/2022 | Tian | H04L 5/0091 |
| 2022/0322362 A1* | 10/2022 | Muruganathan | H04L 5/0053 |
| 2023/0113127 A1* | 4/2023 | Hosseini | H04W 72/23 |
| | | | 370/329 |
| 2023/0232380 A1* | 7/2023 | Bhamri | H04L 1/08 |
| | | | 370/329 |

* cited by examiner

CONFIGURED GRANT OPERATIONS FOR MULTIPLE PUSCH

BACKGROUND INFORMATION

A user equipment (UE) may be configured to establish a connection with a network, for example a 5G New Radio (NR) radio access network (RAN). NR specifications defining operations for frequencies over 52.6 GHz are in development, including support of higher subcarrier spacings (SCSs), e.g., 480 kHz, 960 kHz, etc. The shorter slot lengths associated with these higher SCSs correspond to a larger number of slots in a frame.

Some uplink (UL) and/or downlink (DL) grants may be configured to repeat periodically, which may be referred to as grant-free scheduling or configured grant (CG) for UL transmissions and semi-persistent scheduling (SPS) for DL transmissions. In the increased frequency range (>52.6 GHz), multiple UL and/or DL transmissions may be scheduled in a single period of the configured UL/DL grant. However, a periodic grant comprising multiple UL/DL transmissions requires further specification, relative to periodic grants comprising only a single UL/DL transmission.

SUMMARY

Some exemplary embodiments are related to a processor of a user equipment (UE) configured to perform operations. The operations include receiving from a base station a semi-persistent scheduling (SPS) configuration for physical downlink shared channel (PDSCH) transmissions wherein multiple PDSCHs are transmitted within a single period of the SPS, the SPS configuration including a parameter for a number of hybrid automatic repeat request (HARQ) processes associated with the SPS configuration, receiving from the base station a downlink control information (DCI) transmission for activating the SPS configuration, the DCI including a HARQ process ID for one of the PDSCH transmissions in the SPS configuration, wherein the UE determines a maximum number of PDSCH transmissions allowed within the single period based on the parameter for the number of HARQ processes associated with the SPS configuration, validating the DCI to determine time domain resources to use for the PDSCH transmission and receiving from the base station the multiple PDSCH transmissions within the single SPS period.

Other exemplary embodiments are related to a processor of a base station configured to perform operations. The operations include transmitting to a user equipment (UE) a semi-persistent scheduling (SPS) configuration for physical downlink shared channel (PDSCH) transmissions wherein multiple PDSCHs are transmitted within a single period of the SPS, the SPS configuration including a parameter for a number of hybrid automatic repeat request (HARQ) processes associated with the SPS configuration, transmitting to the UE a downlink control information (DCI) transmission for activating the SPS configuration, the DCI including a HARQ process ID for one of the PDSCH transmissions in the SPS configuration, wherein the UE determines a maximum number of PDSCH transmissions allowed within the single period based on the parameter for the number of HARQ processes associated with the SPS configuration and transmitting to the UE the multiple PDSCH transmissions within the single SPS period.

Still further exemplary embodiments are related to a processor of a user equipment (UE) configured to perform operations. The operations include receiving from a base station a configured grant (CG) configuration for physical uplink shared channel (PUSCH) transmissions wherein multiple PUSCHs are transmitted within a single period of the CG, the CG configuration including a parameter for a number of hybrid automatic repeat request (HARQ) processes associated with the CG configuration, receiving from the base station a downlink control information (DCI) transmission for activating the CG configuration, the DCI including a HARQ process ID for one of the PUSCH transmissions in the CG configuration, wherein the UE determines a maximum number of PUSCH transmissions allowed within the single period based on the parameter for the number of HARQ processes associated with the CG configuration, validating the DCI to determine time domain resources to use for the PUSCH transmission and transmitting to the base station the multiple PUSCH transmissions within the single CG period.

Additional exemplary embodiments are related to a processor of a base station configured to perform operations. The operations include transmitting to a user equipment (UE) a configured grant (CG) configuration for physical uplink shared channel (PUSCH) transmissions wherein multiple PUSCHs are transmitted within a single period of the CG, the CG configuration including a parameter for a number of hybrid automatic repeat request (HARQ) processes associated with the CG configuration, transmitting to the UE a downlink control information (DCI) transmission for activating the CG configuration, the DCI including a HARQ process ID for one of the PUSCH transmissions in the CG configuration, wherein the UE determines a maximum number of PUSCH transmissions allowed within the single period based on the parameter for the number of HARQ processes associated with the CG configuration and transmitting to the UE the multiple PUSCH transmissions within the single CG period.

DETAILED DESCRIPTION

The exemplary embodiments may be further understood with reference to the following description and the related appended drawings, wherein like elements are provided with the same reference numerals. The exemplary embodiments describe operations to support multiple physical downlink shared channel (PDSCH) transmissions and/or multiple physical uplink shared channel (PUSCH) transmissions within a single period of a periodic grant. According to some aspects of the present disclosure, operations are described to support multiple PDSCH transmissions in a single period of a semi-persistent scheduling (SPS) configuration, including, for example, operations for determining the HARQ process IDs for these PDSCH transmissions and design considerations for the downlink control information (DCI) activating one or more of the configured SPS.

According to other aspects of the present disclosure, operations are described to support multiple PUSCH transmissions in a period in a configured grant (CG) configuration, including, for example, operations for determining the HARQ process IDs for these PUSCH transmissions and design considerations for the DCI activating one or more of the configured CGs.

According to still other aspects of the present disclosure, operations are described to support the signaling and procedure for retransmissions of transport blocks (TBs) of a CG having multiple PUSCH transmissions in a period of the CG, including, for example, how to differentiate the DCI for retransmissions from the DCI to activate the CG, and how to determine the resources for the retransmissions of multiple TBs.

The exemplary embodiments are described with regard to operations performed by a user equipment (UE). However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component.

The exemplary aspects are described with regard to the network being a 5G New Radio (NR) network and a base station being a next generation Node B (gNB). However, the use of the 5G NR network and the gNB are provided for illustrative purposes. The exemplary aspects may apply to any type of network that utilizes similar functionalities.

Figure 1:
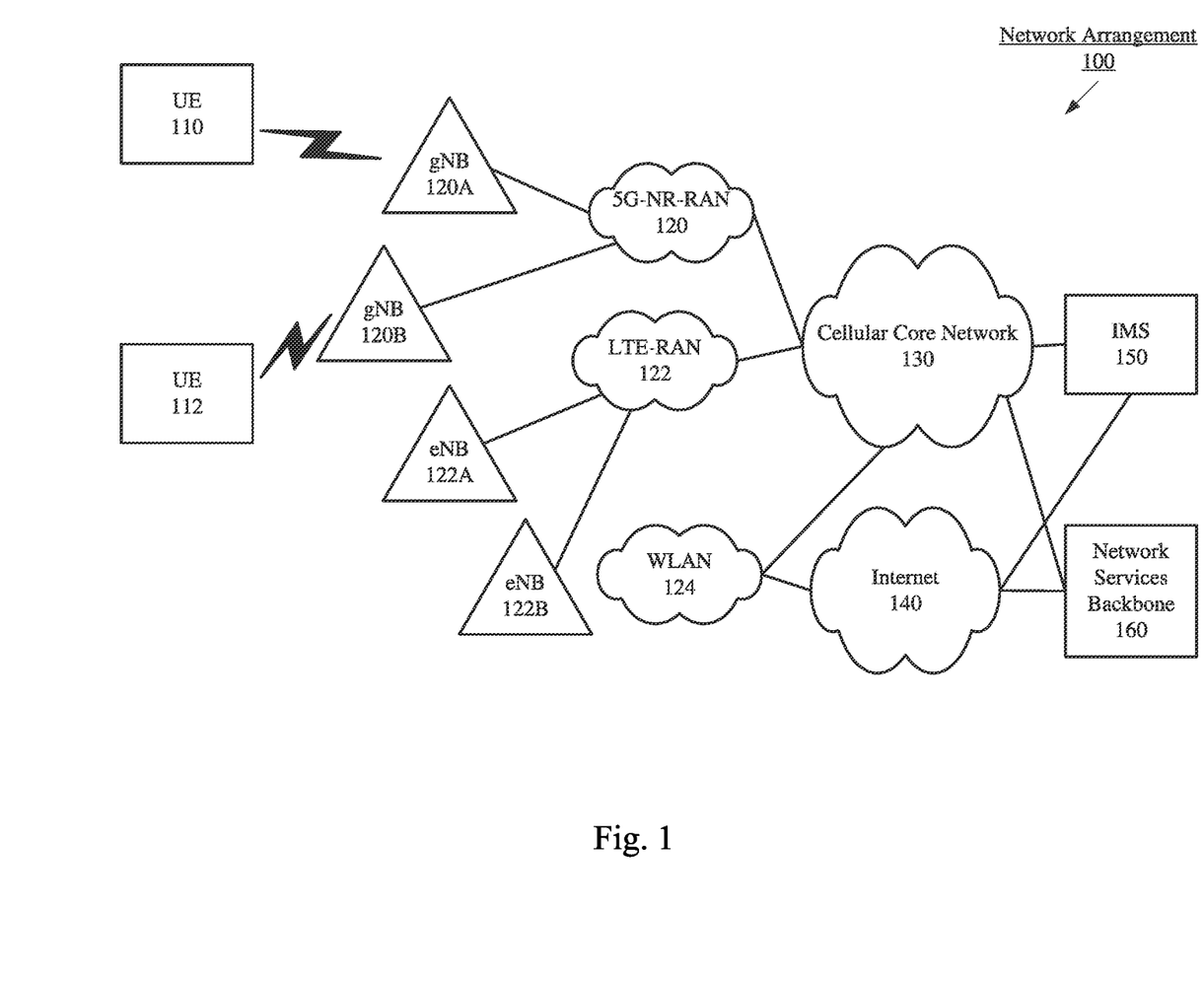
FIG. 1 shows an exemplary network arrangement according to various exemplary embodiments.

FIG. 1 shows an exemplary network arrangement 100 according to various exemplary embodiments. The exemplary network arrangement 100 includes a plurality of UEs 110, 112. Those skilled in the art will understand that the UEs may be any type of electronic component that is configured to communicate via a network, e.g., a component of a connected car, a mobile phone, a tablet computer, a smartphone, a phablet, an embedded device, a wearable, an Internet of Things (IoT) device, etc. It should also be understood that an actual network arrangement may include any number of UEs being used by any number of users. Thus, the example of two UEs 110, 112 is merely provided for illustrative purposes. In some of the exemplary embodiments described below, groups of UEs may be employed to conduct respective channel measurements.

The UEs 110, 112 may communicate with one or more networks. In the example of the network configuration 100, the networks with which the UEs 110, 112 may wirelessly communicate are a 5G NR radio access network (5G NR-RAN) 120, an LTE radio access network (LTE-RAN) 122 and a wireless local access network (WLAN) 124. Therefore, the UEs 110, 112 may include a 5G NR chipset to communicate with the 5G NR-RAN 120, an LTE chipset to communicate with the LTE-RAN 122 and an ISM chipset to communicate with the WLAN 124. However, the UEs 110, 112 may also communicate with other types of networks (e.g., legacy cellular networks) and the UEs 110, 112 may also communicate with networks over a wired connection. With regard to the exemplary embodiments, the UEs 110, 112 may establish a connection with the 5G NR-RAN 120 and/or the LTE-RAN 122.

The 5G NR-RAN 120 and the LTE-RAN 122 may be portions of cellular networks that may be deployed by cellular providers (e.g., Verizon, AT&T, I-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN 120 via at least one of the next generation nodeB (gNB) 120A and/or the gNB 120B. The gNBs 120A, 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to two gNBs 120A, 120B is merely for illustrative purposes. The exemplary embodiments may apply to any appropriate number of gNBs. For example, the UEs 110, 112 may simultaneously connect to and exchange data with a plurality of gNBs in a multi-cell CA configuration. The UEs 110, 112 may also connect to the LTE-RAN 122 via either or both of the eNBs 122A, 122B, or to any other type of RAN, as mentioned above. In the network arrangement 100, the UE 110 is shown as having a connection to the gNB 120A, while the UE 112 is shown as having a connection to gNB 120B. The UE 110 connection to the gNB 120A, according to certain exemplary embodiments, may be over a frequency greater than 52.6 GHz.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g., the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
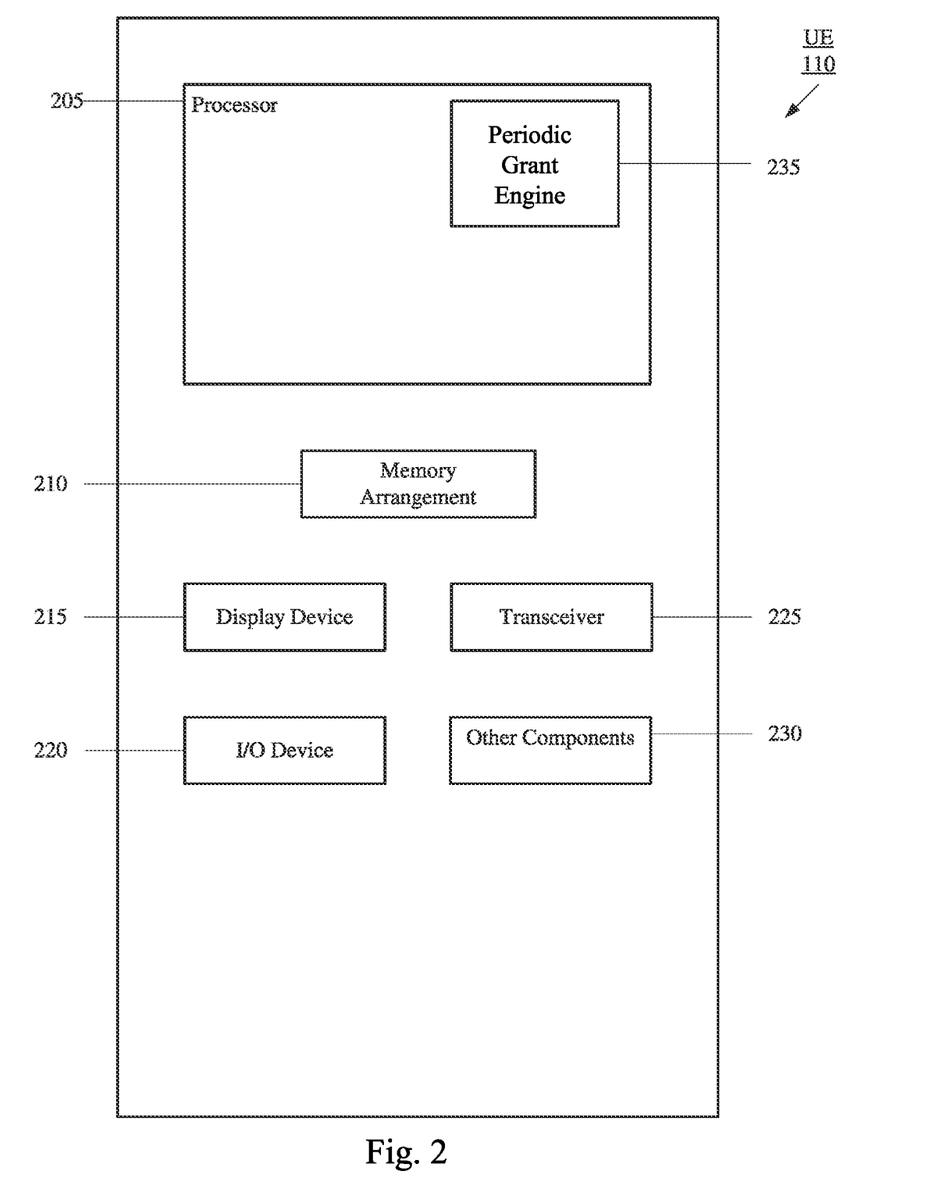
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc. The UE 110 illustrated in FIG. 2 may also represent the UE 112.

The processor 205 may be configured to execute a plurality of engines for the UE 110. For example, the engines may include a periodic grant engine 235 for performing operations including receiving a semi-persistent scheduling (SPS) configuration in which multiple transport blocks (TBs) are scheduled for transmission in a single period of the SPS and/or receiving a configured grant (CG) configuration in which multiple TBs are scheduled for transmission in a single period of the CG. The periodic grant engine 235 may further receive an activation DCI for one of the SPS or CG configurations and perform data transmissions in accordance therewith, to be explained in further detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies). For example, the transceiver 225 may operate on the unlicensed spectrum when e.g., NR-U is configured.

Figure 3:
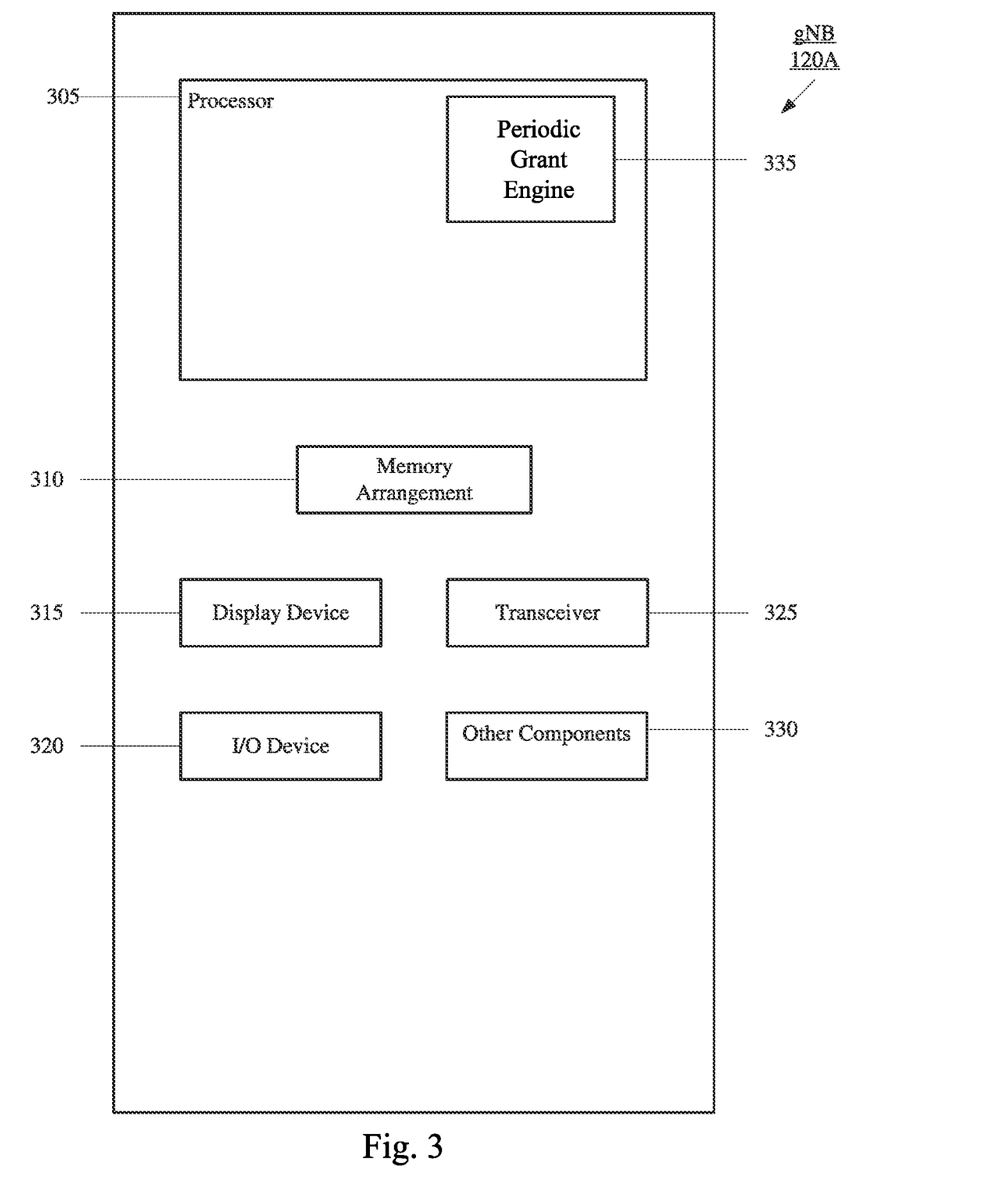
FIG. 3 shows an exemplary network cell according to various exemplary embodiments.

FIG. 3 shows an exemplary network cell, in this case gNB 120A, according to various exemplary embodiments. As noted above with regard to the UE 110, the gNB 120A may represent a cell providing services as a PCell or an SCell, or in a standalone configuration with the UE 110. The gNB 120A may represent any access node of the 5G NR network through which the UEs 110, 112 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a periodic grant engine 335 for performing operations including transmitting a semi-persistent scheduling (SPS) configuration to a UE in which multiple transport blocks (TBs) are scheduled for transmission in a single period of the SPS and/or receiving a configured grant (CG) configuration in which multiple TBs are scheduled for transmission in a single period of the CG. The periodic grant engine 335 may further transmit an activation DCI for one of the SPS or CG configurations, to be explained in further detail below.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100. The transceiver 325 may operate on a variety of different frequencies or channels (e.g., set of consecutive frequencies). For example, the transceiver 325 may operate on unlicensed bandwidths when NR-U functionality is configured. Therefore, the transceiver 325 may include one or more components (e.g., radios) to enable the data exchange with the various networks and UEs.

NR specifications have been developed in Rel-15 and Rel-16 defining operations for frequencies up to 52.6 GHz, where all physical layer channels, signals, procedures, and protocols are designed for uses under 52.6 GHz. NR specifications defining operations for frequencies over 52.6 GHz are in development, including support of higher subcarrier spacings (SCSs), e.g., 480 kHz or 960 kHz. The shorter slot lengths associated with these higher SCSs corresponds to a larger number of slots in a frame.

Some uplink (UL) and/or downlink (DL) grants may be configured to repeat periodically, which may be referred to as grant-free scheduling or configured grant (CG) for UL transmissions and semi-persistent scheduling (SPS) for DL transmissions. In the increased frequency range (>52.6 GHz), multiple UL and/or DL transmissions may be scheduled in a single period of the configured UL/DL grant. However, a periodic grant comprising multiple UL/DL transmissions necessitates further specification, relative to periodic grants comprising only a single UL/DL transmission.

A hybrid automatic repeat request (HARQ) operation includes an acknowledgment/negative-acknowledgement (ACK/NACK) mechanism for indicating whether a transmitted packet was successfully received or should be retransmitted. In the NR system, a Stop And Wait (SAW) process is used for HARQ operations, which relies upon the HARQ-ACK information from the receiver before proceeding to transfer any further data. The round trip time for the SAW process includes both transmitter and receiver data processing times, as well as propagation delays. More specifically, multiple parallel SAW processes, e.g., HARQ processes, are used to avoid the round trip time having an impact on the throughput performance. For example, up to 16 parallel HARQ processes may occur simultaneously for one transmitter/receiver pair.

In NR Rel-16 semi-persistent scheduling (SPS) for downlink transmission scheduling, a single SPS configuration can be associated with multiple HARQ processes. In each SPS period, a single transport block (TB) is transmitted with a corresponding HARQ process ID, which is dependent on the slot index for the PDSCH transmission. In this scenario, the HARQ process ID is determined according to the following equation:

$$\text{HARQ Process ID} = [\text{floor}(\text{CURRENT\_slot} \ast 10/(\text{numberofSlotsPerFrame} \ast \text{periodicity}))] \bmod \text{nrofHARQ-Processes} + \text{harq\_ProcID-Offset},$$

wherein CURRENT_slot=[(SFN*numberofSlotsPerFrame)+slot number in the frame], wherein SFN refers to a subframe number.

In NR Rel-16 configured grant (CG) for uplink transmission scheduling, in type 2 CG, a single TB is transmitted with a corresponding HARQ process ID, which is dependent on the symbol index for this PUSCH transmission. In this scenario, the HARQ process ID is determined according to the following equation:

$$\text{HARQ Process ID} = [\text{floor}(\text{CURRENT\_symbol}/\text{periodicity})] \bmod \text{nrofHARQ-Processes} + \text{harq\_ProcIDOffset2},$$

wherein CURRENT_symbol=(SFN×numberOfSlotsPerFrame×numberOfSymbolsPerSlot+slot number in the frame×numberOfSymbolsPerSlot+symbol number in the slot).

In NR Rel-17 above 52.6 GHz feature, DCI format 0_1 may be used to schedule multiple PUSCHs with a single DCI and DCI format 1_1 may be used to schedule multiple PDSCHs with a single DCI.

In NR operation between 52.6 GHz and 71 GHz, the following features may be supported for multi-PDSCH/PUSCH with a single DCI. First, for a UE and for a serving cell, multiple PDSCHs may be scheduled by a single DL DCI and multiple PUSCHs may be scheduled by a single UL DCI, for example PDSCHs having an SCS of 120 kHz, 480 kHz and 960 kHz and PUSCHs having a SCS of 120 k kHz, 480 kHz, and 960 kHz. Second, each PDSCH or PUSCH may have individual/separate TB(s), and each PDSCH/PUSCH may be confined within a slot. Third, for a DCI that can schedule multiple PUSCHs, a time domain resource allocation (TDRA) table may be extended such that each row indicates up to 8 multiple PDSCHs/PUSCHs (that can be non-continuous in the time-domain). Each PDSCH/PUSCH may have a separate start and length indicator value (SLIV) and mapping type. The number of scheduled PDSCHs/PUSCHs may be implicitly indicated by the number of indicated valid SLIVs in the row of the TDRA table signaled in DCI. This does not preclude continuous resource allocation in the time-domain.

Fourth, for a DCI that can schedule multiple PDSCHs, a modulation and coding scheme (MCS) for the first TB may appear only once in the DCI and apply commonly to the first TB of each PDSCH. A new data indicator (NDI) for the first TB may be signaled per PDSCH and applies to the first TB of each PDSCH. A HARQ process number is applied to the first scheduled PDSCH and is incremented by 1 for subsequent PDSCHs (with modulo operation, if needed).

According to certain aspects of this disclosure, operations are described to support multiple physical downlink shared channel (PDSCH) transmissions and/or multiple physical uplink shared channel (PUSCH) transmissions within a single period of a periodic grant.

According to some exemplary embodiments, operations are described to support multiple PDSCH transmissions in a period in a semi-persistent scheduling (SPS) configuration. The first exemplary embodiment includes solutions for 1) a number of PDSCHs that can be supported in an SPS period; 2) how to calculate the HARQ process ID in case of multiple PDSCH transmissions in a SPS period; 3) how to design the DCI of activating the SPS configuration, including NDI fields and HARQ process IDs in the activating DCI; and 4) how to determine the TDRA for the multiple PDSCH in a SPS period.

According to other exemplary embodiments, operations are described to support multiple PUSCH transmissions in a period in a configured grant (CG) configuration. The second exemplary embodiment includes solutions for 1) a number of PUSCHs that can be supported in a CG period; 2) how to calculate the HARQ process ID in case of multiple PUSCH transmissions in a configured grant; 3) how to determine the repetition number and redundancy version for each PUSCH; 4) how to design the DCI for activating the configured grant configuration, including NDI fields and HARQ process IDs in the activating DCI; and 5) how to determine the TDRA for the multiple PUSCH in a CG period.

According to still further exemplary embodiments, operations are described to support the signaling and procedure for retransmissions of SPS with multiple PDSCH and/or CG with multiple PUSCH. The third exemplary embodiment includes solutions for 1) how to differentiate the DCI for retransmissions of CG and the DCI to activate the CG in case of multiple PUSCH and 2) how to determine the resources for the retransmissions of multiple TBs.

With regard to the exemplary embodiments related to support multiple PDSCH transmissions in a period in SPS configuration, the SPS with multiple PDSCH transmissions may be configured by the network via RRC signaling using SPS-Config, which may include the following parameters: Periodicity; nrofHARQ-Process; n1PUCCH-AN; mcs-table; sps-ConfigIndex-r16; harq-ProcID-Offset-r16; harq-CodebookID-r16; and pdsch-AggregationFactor-r16. The parameter 'nrofHARQ-Process' relates to a number of HARQ processes associated with the SPS configuration.

According to a first aspect of these exemplary embodiments, the maximum number of supported PDSCHs in a SPS period may be upper bounded by the "nrofHARQ-Process" parameter in the SPS configuration to avoid HARQ process reuse within a SPS period. For example, if the SPS configuration is associated with X HARQ processes, e.g., X=2 or X=4, then the maximum number of PDSCHs in a SPS period is X.

In view of the maximum number of PDSCH in the SPS period, the TDRA table used by the UE to determine a time domain resource assignment may be adjusted so that each table entry has a number of SLIV values equal to the maximum number of PDSCHs in the SPS period. The TDRA table entries may be pruned by this maximum number of HARQ processes (X) according to any of at least the following three options. In a first option, the first X values of SLIV of a TDRA table entry are used. In a second option, the last X values of SLIV of a TDRA table entry are used. In a third option, the X values of SLIV of a TDRA table entry that are used are configurable by the network.

The SPS configuration is modified to support different repetitions for different TBs, wherein each TB in a SPS period has a different number of repetitions. The parameter "pdsch-AggregationFactor" provides the number of transmissions to be applied to the TB, wherein "pdsch-Aggregation-Factor-list" is a sequence of "pdsch-AggregationFactor" parameters, each parameter associated with a different TB. In one option, the maximum sequence length may be a predefined value, such as 8 or 4. In another option, the maximum sequence length may depend on the "nrofHARQ-Processes" field in the SPS configuration.

In a second aspect of these exemplary embodiments, the HARQ process ID for multiple PDSCH transmissions may be assigned according to any of at least the following three options. In a first option, the HARQ process ID is continuously increased within a period. In this option, within each SPS period, the HARQ process ID for the first PDSCH transmission is based on the existing formula for SPS Rel-16 discussed above. The subsequent PDSCH transmissions within the same period (starting after the first PDSCH transmission) have HARQ process IDs incremented by 1 with the modulo operation, independent of slot index.

In a second option, the HARQ process ID is continuously increased over periods. In this option, for the first SPS period, the HARQ process ID for the first PDSCH transmission is based on the existing formula. The subsequent PDSCH transmissions within the same period (starting after the first PDSCH transmission) have HARQ process IDs incremented by 1 with the modulo operation, independent of slot index, similar to the first option. However, contrary to the first option, in the second option, for the following SPS periods, the HARQ process ID continues to be incremented by 1 with the modulo operation, independent of slot index.

In a third option the HARQ process ID is dependent on the slot index. In this option, each PDSCH transmission, regardless of its location within an SPS period or over different SPS periods, has its own independent HARQ process ID calculation using the existing formula.

According to a third aspect of these exemplary embodiments, the new data indicator (NDI) field in the activation DCI for the SPS PDSCH is only a single bit, even though the SPS is associated with multiple PDSCHs. The NDI is used only for validating the activation DCI, so a unique NDI value for multiple PDSCHs is not required.

According to a fourth aspect of these exemplary embodiments, SLIVs may be configured within each SPS configuration. In one option, a TDRA table with corresponding SLIVs may be included in the SPS configuration, wherein different TDRA tables are configured for SPS configuration and for dynamic scheduling. In this option, in the activating DCI of the SPS configuration, the TDRA table entry for SLIVs is no longer used.

According to a fifth aspect of these exemplary embodiments, the activating DCI for the SPS configuration may be validated in the following way. In a first option, the HARQ process ID in the DCI may be equal to the smallest HARQ process ID configured in the corresponding SPS configuration. In another option, the HARQ process ID in the DCI may be equal to the largest HARQ process ID configured in the corresponding SPS configuration. Based on the validation option used, the UE knows which SPS configuration is activated by the corresponding HARQ process ID in the DCI.

According to a sixth aspect of these exemplary embodiment, for validating an activation DCI used to activate multiple SPS configurations, the activation DCI may include a TDRA entry indicating which SPS configurations to activate jointly. The sixth aspect is used in consideration of some SPS configurations being unable to be used with some other SPS configurations because these SPS configurations may have overlapped HARQ process IDs. The TDRA entry in the activating DCI indicates which SPS configurations to activate jointly.

Figure 4:
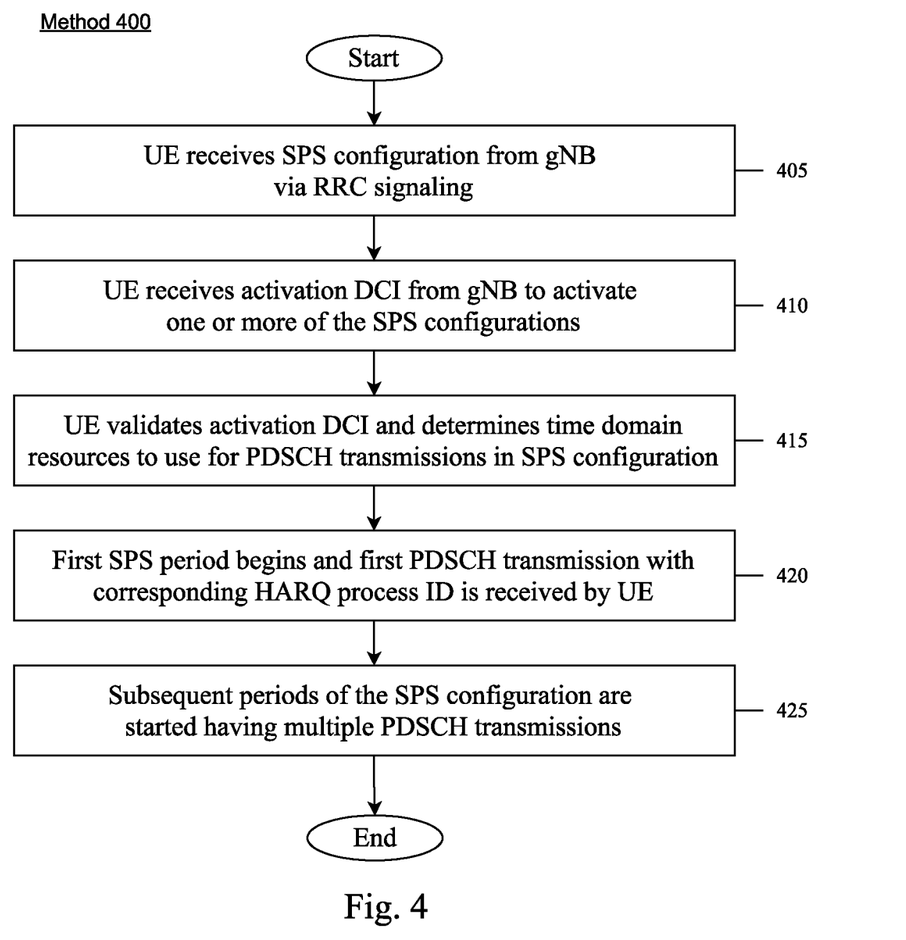
FIG. 4 shows a method for a semi-persistent scheduling (SPS) configuration and activation for multiple PDSCH according to various exemplary embodiments.

FIG. 4 shows a method 400 for a semi-persistent scheduling (SPS) configuration and activation for multiple PDSCH according to various exemplary embodiments described herein. As described above, the method 400 may be used when multiple PDSCH are configurable in a single SPS period. The method 400 is described relative to the network arrangement 100 described above in FIG. 1, including the UE 110 and the gNB 120A of the 5G NR-RAN 120.

In 405, the UE receives an SPS configuration from the gNB via RRC signaling. The parameters included in the SPS configuration include a number of HARQ processes associated with the SPS configuration. As described above in the first aspect of these exemplary embodiments, the maximum number of HARQ processes parameter may correspond to the maximum number of PDSCHs in the SPS period. Further, the SPS configuration may include a sequence of "pdsch-AggregationFactor" parameters, wherein each "repK" and "pdsch-AggregationFactor" is associated with a different TB. As described above in the fourth aspect of these exemplary embodiments, the SPS configuration may also include a TDRA table that is reduced to include a number of entries equal to the maximum number of HARQ processes allowed.

In 410, the UE receives an activation DCI from the gNB to activate one or more of the SPS configurations. The activating DCI may include a TDRA table entry for the UE to determine the time domain resources for the SPS. When the TDRA table is provided by the network in 405, the activation DCI may not include a TDRA table entry for SLIVs. If the default TDRA table is used, the activation DCI may include the TDRA table entry for SLIVs. In the activation DCI, the NDI may comprise only a single bit, as described above in the third aspect of these exemplary embodiments. The activating DCI further includes a HARQ process ID for one of the PDSCH transmissions, e.g., a smallest or largest HARQ process ID used in the SPS configuration.

In 415, the UE validates the activation DCI and determines the time domain resources to use for PDSCH transmissions in the SPS configuration. The UE knows which SPS configuration(s) to activate by the corresponding HARQ process ID in the DCI.

In 420, the first SPS period begins and the first PDSCH transmission with the corresponding HARQ process ID is received by the UE from the gNB. For subsequent PDSCH transmissions, the HARQ process ID is determined according to any of the options discussed above with respect to the second aspect of these exemplary embodiments. For example, in one option, the HARQ IDs may be incremented for PDSCH transmissions within the period, then restarted for the next period. In another option, the HARQ IDs are continuously incremented across SPS periods. In still another option, the HARQ IDs are calculated for each PDSCH transmission according to the existing formula.

In 425, subsequent periods of the SPS configuration are started having multiple PDSCH transmissions. As discussed above, the HARQ process IDs for the PDSCH transmissions within the subsequent periods are determined according to the options described above. For example, the HARQ process ID may be calculated for the first PDSCH transmission in each period using the existing formula. In another option, the HARQ process ID for PDSCH transmissions in the subsequent periods continues to be incremented by 1 relative to the HARQ process ID for the PDSCH transmissions in previous periods. In still another option, the HARQ process ID for all PDSCH transmissions in all of the periods of the SPS configuration are calculated using the existing formula.

With regard to the exemplary embodiments related to support multiple PUSCH transmissions in a period in a CG configuration, the CG configuration may be designed according to the following considerations. It is noted that these exemplary embodiments are applicable for type 2 CG (comprising an activating DCI).

According to a first aspect of these exemplary embodiments, the maximum number of supported PUSCHs in a type 2 configured grant (CG) period is upper bounded by the "nrofHARQ-Process" in the CG configuration. Similar to the first exemplary embodiment, this parameter is used to bound the maximum number of PUSCH within the period to avoid HARQ process reuse within a CG period. For example, if the CG configuration is associated with X HARQ processes, then the maximum number of PUSCHs in a CG period is X.

Each TDRA table entry may be pruned by this maximum number HARQ processes. Similar to the exemplary embodiments described above, in a first option, the first X values of SLIV of a TDRA table entry are used. In a second option, the last X values of SLIV of a TDRA table entry are used. In a third option, the X values of SLIV of a TDRA table entry that are used are configurable by the network.

According to a second aspect of these exemplary embodiments, the CG configuration is modified to support different repetitions for different TBs, wherein each TB in a Type 2 CG period has a different number of repetitions or different RV sequences. The parameter "repK" provides the number of transmissions to be applied to the TB, wherein "repK-list" is a sequence of "repK" parameters, each parameter associated with a different TB. The parameter "repK-RV" provides the RV pattern to be applied to the repetitions, wherein "repK-RV-list" is a sequence of "repK-RV" parameters, each parameter associated with a different TB. In one option, the maximum sequence length may be a predefined value, such as 8 or 4. In another option, the maximum sequence length may depend on the "nrofHARQ-Processes" field in the CG configuration.

According to a third aspect of these exemplary embodiments, the HARQ process ID for multiple PUSCH transmissions may be assigned according to any of at least the following three options, similar to the HARQ process ID determination for SPS according to the exemplary embodiments described above. In a first option, the HARQ process ID is continuously increased within a CG period. In this option, within each CG period, the HARQ process ID for the first PUSCH HARQ process ID is based on the existing formula. The subsequent PUSCH transmissions within the same CG period (starting after the first PUSCH transmission) have HARQ process IDs incremented by 1 with the modulo operation, independent of slot index.

In a second option, the HARQ process ID is continuously increased over periods. In this option, for the first CG period, the HARQ process ID for the first PUSCH transmission is based on the existing formula. The subsequent PUSCH transmissions within the same period (starting after the first PUSCH transmission) have HARQ process IDs incremented by 1 with the modulo operation, independent of slot index. In the second option, for the following CG periods, the HARQ process ID continues to be incremented by 1 with the modulo operation, independent of slot index.

In a third option the HARQ process ID is dependent on the slot index. In this option, each PUSCH transmission, regardless of its location within a CG period or over different CG periods, has its own independent HARQ process ID calculation using the existing formula.

According to a fourth aspect of these exemplary embodiments, SLIVs may be configured within each CG configuration. In one option, a TDRA table with corresponding SLIVs may be included in the CG configuration, wherein different TDRA tables are configured for CG configuration and for dynamic scheduling. In this option, in the activating DCI of the CG configuration, the TDRA table entry for SLIVs is no longer used.

According to a fifth aspect of these exemplary embodiments, the activating DCI for the CG configuration may be validated in the following way. In a first option, the HARQ process ID in the DCI may be equal to the smallest HARQ process ID configured in the corresponding CG configuration. In another option, the HARQ process ID in the DCI may be equal to the largest HARQ process ID configured in the corresponding CG configuration. Based on the validation option used, the UE is able to know which CG configuration is activated by the corresponding HARQ process ID in the DCI.

According to a sixth aspect of these exemplary embodiments, for validating an activation DCI used to activate multiple CG configurations, the activation DCI may include a TDRA entry indicating which CG configurations to activate jointly. The sixth aspect is used in consideration of some CG configurations being unable to be used with some other CG configurations because these CG configurations would have overlapped HARQ process IDs. The TDRA entry in the activating DCI indicate which CG configurations to activate jointly.

Figure 5:
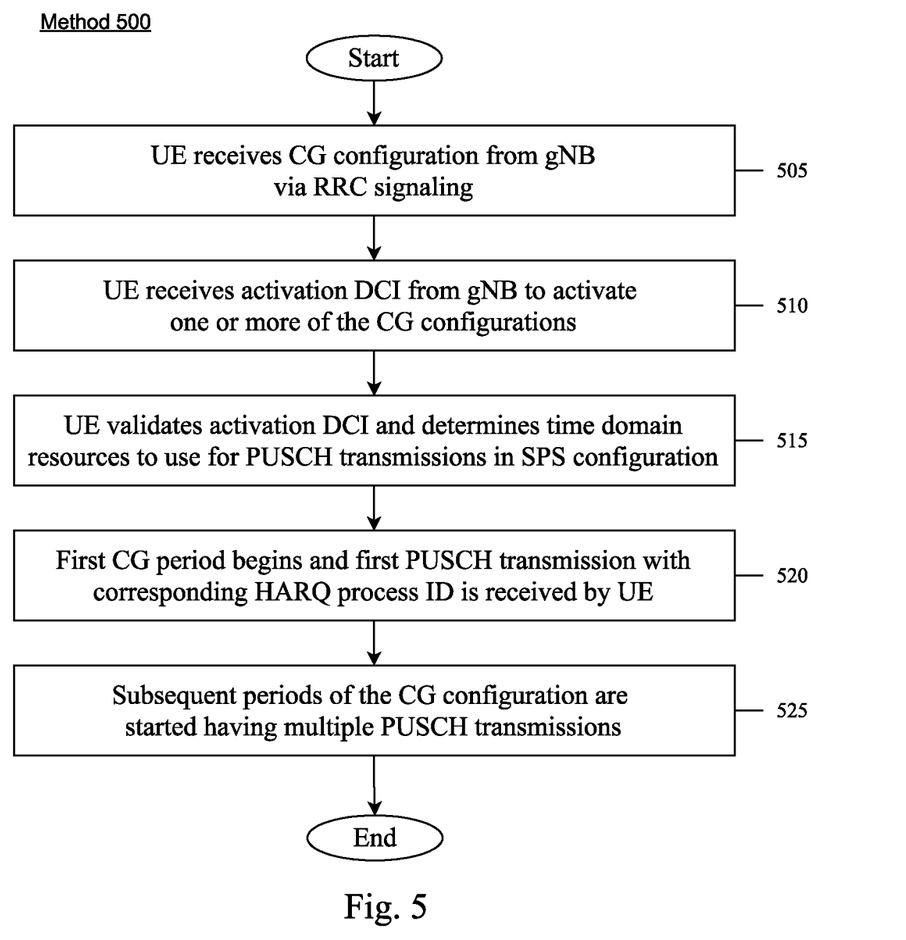
FIG. 5 shows a method for a configured grant (CG) configuration and activation for multiple PUSCH according to various exemplary embodiments.

FIG. 5 shows a method 500 for a configured grant (CG) configuration and activation for multiple PUSCH according to various exemplary embodiments described herein. As described above, the method 500 may be used when multiple PUSCH are configurable in a single CG period. The method 500 is described relative to the network arrangement 100 described above in FIG. 1, including the UE 110 and the gNB 120A of the 5G NR-RAN 120.

In 505, the UE receives the CG configuration from the gNB via RRC signaling. The parameters included in the CG configuration include a number of HARQ processes associated with the CG configuration. As described above in the first aspect of these exemplary embodiments, the maximum number of HARQ processes parameter may correspond to the maximum number of PUSCHs in the CG period. As described above in the second aspect of these exemplary embodiments, the CG configuration may include a sequence of "repK" and "repK-RV" parameters, wherein each "repK" and "repK-RV" is associated with a different TB. As described above in the fourth aspect of these exemplary embodiments, the CG configuration may also include a TDRA table that is reduced to include a number of entries equal to the maximum number of HARQ processes allowed.

In 510, the UE receives an activation DCI from the gNB to activate one or more of the CG configurations. The activating DCI may include a TDRA table entry for the UE to determine the time domain resources for the CG. When the TDRA table is provided by the network in 505, the activation DCI may not include a TDRA table entry for SLIVs. If the default TDRA table is used, the activation DCI may include the TDRA table entry for SLIVs. The activating DCI further includes a HARQ process ID for one of the PUSCH transmissions, e.g., a smallest or largest HARQ process ID used in the CG configuration.

In 515, the UE validates the activation DCI and determines the time domain resources to use for PUSCH transmissions in the SPS configuration. The UE knows which CG configuration(s) to activate by the corresponding HARQ process ID in the DCI.

In 520, the first CG period begins and the first PUSCH transmission with the corresponding HARQ process ID is received by the UE from the gNB. For subsequent PUSCH transmissions, the HARQ process ID is determined according to any of the options discussed above with respect to the third aspect of the second exemplary embodiment. That is, in one option, the HARQ IDs may be incremented for PUSCH transmissions within the period, then restarted for the next period. In another option, the HARQ IDs are continuously incremented across CG periods. In still another option, the HARQ IDs are calculated for each PUSCH transmission according to the existing formula.

In 525, subsequent periods of the CG configuration are started having multiple PUSCH transmissions. As discussed above, the HARQ process IDs for the PUSCH transmissions within the subsequent periods are determined according to the options described above. For example, the HARQ process ID may be calculated for the first PUSCH transmission in each period using the existing formula. In another option, the HARQ process ID for PUSCH transmissions in the subsequent periods continues to be incremented by 1 relative to the HARQ process ID for the PUSCH transmissions in previous periods. In still another option, the HARQ process ID for all PUSCH transmissions in all of the periods of the CG configuration are calculated using the existing formula.

According to the exemplary embodiments related to retransmissions in the CG with multiple PUSCH transmissions, the gNB may receive/decode only a subset of the TBs. The missing TBs may be associated with continuous HARQ process numbers or non-continuous HARQ process numbers.

According to a first option, existing DCI fields are used to differentiate the DCI for dynamic grant for retransmissions of the CG and the DCI for activating/releasing a CG. The NDI fields for all the PUSCH are set to zero in the DCI for activating/releasing a CG with multiple PUSCH. If at least one NDI field for a certain PUSCH is 1 in the DCI, then the DCI is for the grant for retransmissions of the CG. In the DCI for the retransmission of multiple TBs, following the CG with multiple PUSCH, the NDI field being set to 1 indicates the corresponding TB needs to be retransmitted. In the following it is assumed that a total of Y NDI fields are set to 1.

In a first use case, if the number (X) of SLIVs in the TDRA table in the DCI is equal to the total number of PUSCH supported in the CG, then the following options may be used. In a first option, only the SLIVs of the TDRA field corresponding to the NDI with value 1 are considered as valid, while the other SLIVs of the TDRA field in the DCI are invalid. In a second option, the first Y SLIVs of the TDRA field are used, while the remaining SLIVs of the TDRA field are not used. In a third option, the last Y values of the SLIVs in the TDRA table entry are used. In a fourth option, only the configured Y values of the SLIVs in the TDRA table entry are used.

In a second use case, if the number of TDRA/FDRA fields in the DCI is equal to the total number of NDI fields in the DCI set to 1, there is one-to-one mapping between the TDRA/FDRA fields and the retransmission TBs.

Figure 6:
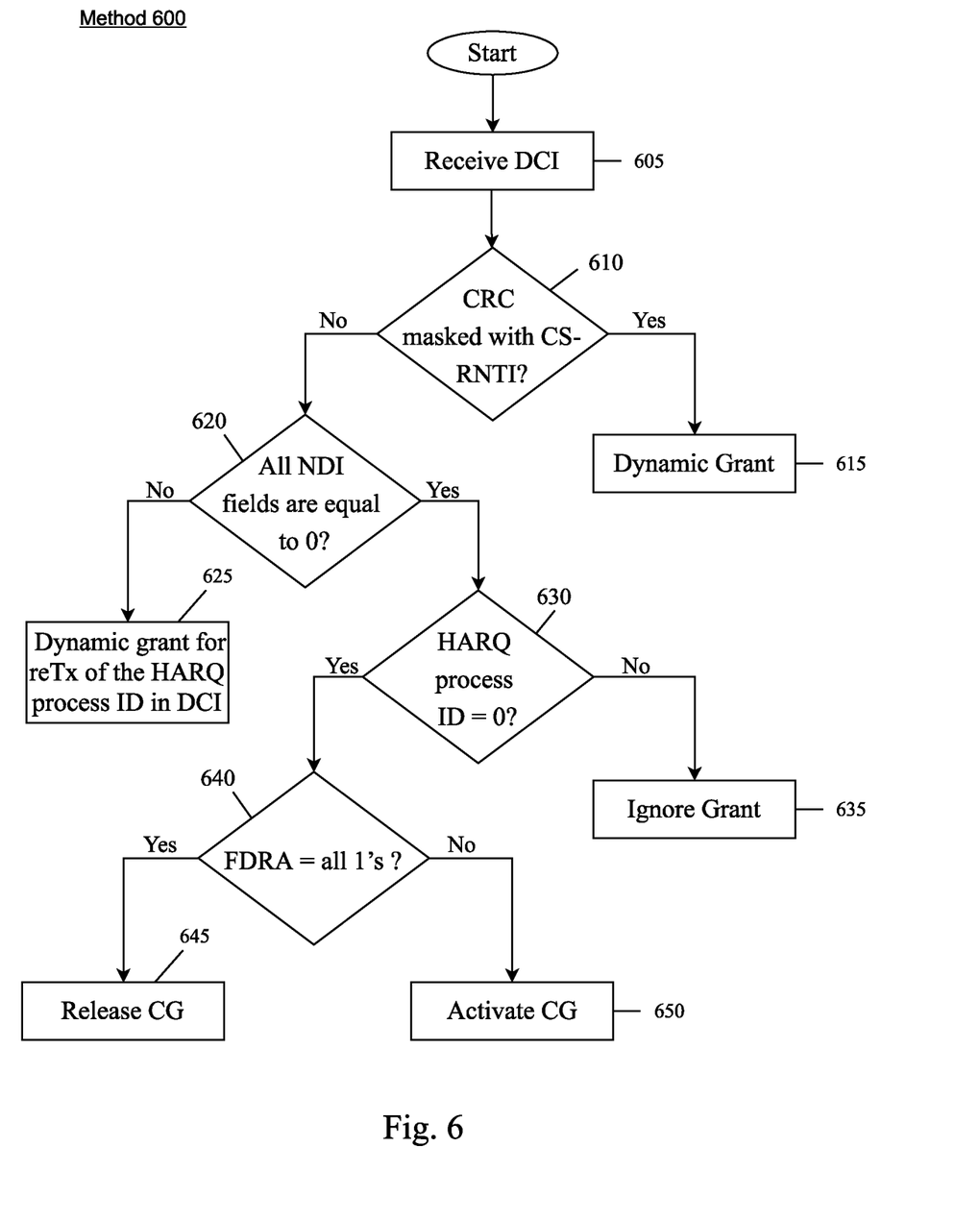
FIG. 6 shows a flowchart for retransmissions in a configured grant having multiple PUSCH transmissions in a single period according to various exemplary embodiments.

FIG. 6 shows a flowchart 600 for retransmissions in a configured grant having multiple PUSCH transmissions in a single period. In 605, the UE receives a DCI from the network. In 610, the UE determines whether the cyclic redundancy check (CRC) of the DCI is masked with CS-RNTI. In 615, if the DCI is masked with CS-RNTI, then the grant is a dynamic grant.

In 620, if DCI is not masked with CS-RNTI, then the UE determines whether all NDI fields in the DCI are equal to 0. In 625, if at least one of the NDI fields is not 0, then the grant is a dynamic grant for retransmissions of the HARQ process ID in the DCI. In 630, if the NDI fields are all 0, then the UE determines whether the HARQ process ID is 0. In 635, if the HARQ process ID is not 0, then the grant is ignored. In 640, if the HARQ process ID is 0, then it is determined whether the FDRA fields are all equal to 1. In 645, if the FDRA fields are all equal to 1, then the CG is released. In 650, if the FDRA fields are not all equal to 1, then the CG is activated.

According to a second option, new DCI fields are added to indicate which PUSCH of a CG should be retransmitted. In the DCI for the retransmission of multiple TBs, following the CG with multiple PUSCH, the HARQ process field is set to indicate the HARQ process ID corresponding to the first PUSCH in the CG. Additionally, in the DCI, there is a new field to indicate which TBs need to be retransmitted.

The field bit length may be equal to the actual/maximum/configured number of PUSCHs in the CG, e.g., 4 bits. Each bit is used to indicate whether or not to retransmit the PUSCH. The field may be a new field, or may be re-interpreted by other fields (e.g., CBGTI fields in DCI). If the number of TBs to be retransmitted Y (e.g., the number of is in the bit field) is smaller than the number of SLIVs of the TDRA table entry indicated by the DCI, the following options may be used. In a first option, only the first Y values of the SLIVs in the TDRA table entry are used. In a second option, only the last Y values of the SLIVs in the TDRA table entry are used. In a third option, only the configured Y values of the SLIVs in the TDRA table entry are used.

The above described exemplary embodiments may be applied to the retransmissions of SPS configuration with multiple PDSCH as well.

EXAMPLES

In a first example, a processor of a base station is configured to perform operations comprising transmitting to a user equipment (UE) a semi-persistent scheduling (SPS) configuration for physical downlink shared channel (PDSCH) transmissions wherein multiple PDSCHs are transmitted within a single period of the SPS, the SPS configuration including a parameter for a number of hybrid automatic repeat request (HARQ) processes associated with the SPS configuration, transmitting to the UE a downlink control information (DCI) transmission for activating the SPS configuration, the DCI including a HARQ process ID for one of the PDSCH transmissions in the SPS configuration, wherein the UE determines a maximum number of PDSCH transmissions allowed within the single period based on the parameter for the number of HARQ processes associated with the SPS configuration and transmitting to the UE the multiple PDSCH transmissions within the single SPS period.

In a second example, the processor of the first example, wherein the HARQ process ID for a first one of the PDSCH transmissions in a first period of the SPS configuration is determined based on a formula for calculating the HARQ process ID, wherein the formula is dependent on a slot index for the first PDSCH transmission.

In a third example, the processor of the second example, wherein subsequent PDSCH transmissions within the first period are incremented by 1, independent of a slot index for the subsequent PDSCH transmissions.

In a fourth example, the processor of the third example, wherein, in subsequent periods of the SPS configuration, a HARQ process ID for the PDSCH transmissions is determined according the HARQ process ID determination for the first period.

In a fifth example, the processor of the second example, wherein subsequent PDSCH transmissions within the first period are incremented by 1, independent of a slot index for the subsequent PDSCH transmissions, and subsequent PDSCH transmissions in subsequent periods of the SPS configuration continue to be incremented by 1, independent of a slot index for the subsequent PDSCH transmissions in the subsequent periods of the SPS configuration.

In a sixth example, the processor of the second example, wherein a HARQ process ID for all of the PDSCH transmissions in the SPS configuration is calculated based on the formula.

In a seventh example, the processor of the first example, wherein a new data indicator (NDI) in the activation DCI is a single bit.

In an eighth example, the processor of the first example, wherein a time domain resource allocation (TDRA) table used to determine the time domain resources for the PDSCH transmissions is included in the SPS configuration.

In a ninth example, the processor of the first example, wherein the SPS configuration includes a sequence of pdsch-AggregationFactor parameters, wherein each of the pdsch-AggregationFactor parameters corresponds to a different transport block (TB) in the single period of the SPS configuration.

In a tenth example, a processor of a user equipment (UE) is configured to perform operations comprising receiving from a base station a configured grant (CG) configuration for physical uplink shared channel (PUSCH) transmissions wherein multiple PUSCHs are transmitted within a single period of the CG, the CG configuration including a parameter for a number of hybrid automatic repeat request (HARQ) processes associated with the CG configuration, receiving from the base station a downlink control information (DCI) transmission for activating the CG configuration, the DCI including a HARQ process ID for one of the PUSCH transmissions in the CG configuration, wherein the UE determines a maximum number of PUSCH transmissions allowed within the single period based on the parameter for the number of HARQ processes associated with the CG configuration, validating the DCI to determine time domain resources to use for the PUSCH transmission and transmitting to the base station the multiple PUSCH transmissions within the single CG period.

In an eleventh example, the processor of the tenth example, wherein the CG configuration includes a sequence of repK parameters and repK-RV parameters, wherein each of the repK and repK-RV parameters corresponds to a different transport block (TB) in the single period of the CG.

In a twelfth example, the processor of the tenth example, wherein a time domain resource allocation (TDRA) table used to determine the time domain resources for the PUSCH transmissions is included in the CG configuration.

In a thirteenth example, the processor of the tenth example, wherein the DCI is validated based on the HARQ process ID included in the DCI being equal to a smallest HARQ process ID configured in the CG configuration.

In a fourteenth example, the processor of the tenth example, wherein the DCI is validated based on the HARQ process ID included in the DCI being equal to a largest HARQ process ID configured in the CG configuration.

In a fifteenth example, the processor of the tenth example, wherein, when multiple CG configurations are activated in the DCI, the DCI includes a time domain resource allocation (TDRA) table entry indicating which CG configurations to activate jointly.

In a fifteenth example, the processor of the tenth example, wherein the operations further comprise receiving from the base station a further DCI for retransmissions of transport blocks (TBs) that were unsuccessfully decoded by the base station.

In a sixteenth example, the processor of the fifteenth example, wherein the further DCI includes a new data indicator (NDI) field set to 1 for at least one PUSCH and the UE determines, based on the NDI field set to 1, that the DCI is for retransmissions.

In a seventeenth example, the processor of the sixteenth example, wherein start and length indicator values (SLIVs) in a time domain resource allocation (TDRA) table entry in the further DCI is equal to the maximum number of PUSCH transmissions allowed within the single period.

In an eighteenth example, the processor of the seventeenth example, wherein only SLIVs corresponding to the NDI fields set to 1 are considered valid.

In a nineteenth example, the processor of the seventeenth example, wherein a total of Y NDI fields are set to 1, wherein a first Y SLIVs of the TDRA table are used.

In a twentieth example, the processor of the seventeenth example, wherein a total of Y NDI fields are set to 1, wherein a last Y SLIVs of the TDRA table are used.

In a twenty first example, the processor of the seventeenth example, wherein a total of Y NDI fields are set to 1, wherein a number Y SLIVs are used according to a network configuration.

In a twenty second example, the processor of the sixteenth example, wherein a number of time domain resource allocation (TDRA) or frequency domain resource allocation (FDRA) field in the further DCI is equal to a number of NDI fields set to 1, wherein the TDRA or FDRA field is one-to-one mapped to the retransmission TBs.

In a twenty third example, the processor of the fifteenth example, wherein a HARQ process field in the further DCI indicates a HARQ process ID corresponding to a first PUSCH transmission in the CG.

In a twenty fourth example, the processor of the twenty third example, wherein a field in the further DCI indicates which TBs are to be transmitted.

In a twenty fifth example, the processor of the twenty fourth example, wherein a bit length of the field is equal to a number of configured PUSCH in the CG, wherein each bit is used to indicate whether to retransmit the corresponding PUSCH.

In a twenty sixth example, the processor of the twenty fourth example, wherein the field is a new field or a re-interpreted field.

In a twenty seventh example, the processor of the twenty sixth example, wherein the re-interpreted field is a code block group transmission information (CBGTI) field.

In a twenty eighth example, the processor of the twenty fourth example, wherein a number Y of TBs to be retransmitted is smaller than a number of SLIVs of a time domain resource allocation (TDRA) table entry indicated by the further DCI.

In a twenty ninth example, the processor of the twenty eighth example, wherein only a first Y values of SLIV in the TDRA table are used.

In a thirtieth example, the processor of the twenty eighth example, wherein only a last Y values of SLIV in the TDRA table are used.

In a thirty first example, the processor of the twenty eighth example, wherein Y values of SLIV in the TDRA table are used according to a network configuration.

In a thirty second example, a processor of a base station configured to perform operations comprising transmitting to a user equipment (UE) a configured grant (CG) configuration for physical uplink shared channel (PUSCH) transmissions wherein multiple PUSCHs are transmitted within a single period of the CG, the CG configuration including a parameter for a number of hybrid automatic repeat request (HARQ) processes associated with the CG configuration, transmitting to the UE a downlink control information (DCI) transmission for activating the CG configuration, the DCI including a HARQ process ID for one of the PUSCH transmissions in the CG configuration, wherein the UE determines a maximum number of PUSCH transmissions allowed within the single period based on the parameter for the number of HARQ processes associated with the CG configuration and transmitting to the UE the multiple PUSCH transmissions within the single CG period.

In a thirty third example, the processor of the thirty second example, wherein the HARQ process ID for a first one of the PUSCH transmissions in a first period of the CG configuration is determined based on a formula for calculating the HARQ process ID, wherein the formula is dependent on a slot index for the first PUSCH transmission.

In a thirty fourth example, the processor of the thirty third example, wherein subsequent PUSCH transmissions within the first period are incremented by 1, independent of a slot index for the subsequent PUSCH transmissions.

In a thirty fifth example, the processor of the thirty fourth example, wherein, in subsequent periods of the CG configuration, a HARQ process ID for the PUSCH transmissions is determined according the HARQ process ID determination for the first period.

In a thirty sixth example, the processor of the thirty third example, wherein subsequent PUSCH transmissions within the first period are incremented by 1, independent of a slot index for the subsequent PUSCH transmissions, and subsequent PUSCH transmissions in subsequent periods of the CG configuration continue to be incremented by 1, independent of a slot index for the subsequent PUSCH transmissions in the subsequent periods of the CG configuration.

In a thirty seventh example, the processor of the thirty third example, wherein a HARQ process ID for all of the PUSCH transmissions in the CG configuration is calculated based on the formula.

In a thirty eighth example, the processor of the thirty second example, wherein the CG configuration includes a sequence of repK parameters and repK-RV parameters, wherein each of the repK and repK-RV parameters corresponds to a different transport block (TB) in the single period of the CG.

In a thirty ninth example, the processor of the thirty second example, wherein a time domain resource allocation (TDRA) table used to determine the time domain resources for the PUSCH transmissions is included in the CG configuration.

In a fortieth example, the processor of the thirty second example, wherein the operations further comprise transmitting to the UE a further DCI for retransmissions of transport blocks (TBs) that were unsuccessfully decoded by the base station.

In a forty first example, the processor of the fortieth example, wherein the further DCI includes a new data indicator (NDI) field set to 1 for at least one PUSCH and the UE determines, based on the NDI field set to 1, that the DCI is for retransmissions.

In a forty second example, the processor of the forty first example, wherein a number of start and length indicator values (SLIVs) in a time domain resource allocation (TDRA) table entry in the further DCI is equal to the maximum number of PUSCH transmissions allowed within the single period.

In a forty third example, the processor of the forty second example, wherein only SLIVs corresponding to the NDI fields set to 1 are considered valid.

In a forty fourth example, the processor of the forty second example, wherein a total of Y NDI fields are set to 1, wherein a first Y SLIVs of the TDRA table are used.

In a forty fifth example, the processor of the forty second example, wherein a total of Y NDI fields are set to 1, wherein a last Y SLIVs of the TDRA table are used.

In a forty sixth example, the processor of the forty second example, wherein a total of Y NDI fields are set to 1, wherein a number Y SLIVs are used according to a network configuration.

In a forty seventh example, the processor of the forty first example, wherein a number of time domain resource allocation (TDRA) or frequency domain resource allocation (FDRA) field in the further DCI is equal to a number of NDI fields set to 1, wherein the TDRA or FDRA field is one-to-one mapped to the retransmission TBs.

In a forty eighth example, the processor of the fortieth example, wherein a HARQ process field in the further DCI indicates a HARQ process ID corresponding to a first PUSCH transmission in the CG.

In a forty ninth example, the processor of the forty eighth example, wherein a field in the further DCI indicates which TBs are to be transmitted.

In a fiftieth example, the processor of the forty ninth example, wherein a bit length of the field is equal to a number of configured PUSCH in the CG, wherein each bit is used to indicate whether to retransmit the corresponding PUSCH.

In a fifty first example, the processor of the forty ninth example, wherein the field is a new field or a re-interpreted field.

In a fifty second example, the processor of the fifty first example, wherein the re-interpreted field is a code block group transmission information (CBGTI) field.

In a fifty third example, the processor of the forty ninth example, wherein a number Y of TBs to be retransmitted is smaller than a number of SLIVs of a time domain resource allocation (TDRA) table entry indicated by the further DCI.

In a fifty fourth example, the processor of the fifty third example, wherein only a first Y values of SLIV in the TDRA table are used.

In a fifty fifth example, the processor of the fifty third example, wherein only a last Y values of SLIV in the TDRA table are used.

In a fifty sixth example, the processor of the fifty third example, wherein Y values of SLIV in the TDRA table are used according to a network configuration.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A processor of a base station configured to:
generate, for transmission to a user equipment (UE), a configured grant (CG) configuration for physical uplink shared channel (PUSCH) transmissions wherein multiple PUSCHs are transmitted within a single period of the CG, the CG configuration including a parameter for a number of hybrid automatic repeat request (HARQ) processes associated with the CG configuration;
generate, for transmission to the UE, a downlink control information (DCI) transmission for activating the CG configuration, the DCI including a HARQ process ID for one of the PUSCH transmissions in the CG configuration, wherein the UE determines a maximum number of PUSCH transmissions allowed within the single period based on the parameter for the number of HARQ processes associated with the CG configuration, wherein the HARQ process ID for a first one of the PUSCH transmissions in a first period of the CG configuration is determined based on a formula for calculating the HARQ process ID, wherein subsequent PUSCH transmissions within the first period are incremented by 1, independent of a slot index for the subsequent PUSCH transmissions; and
receive, from the UE, the multiple PUSCH transmissions within the single CG period.

2. The processor of claim 1, wherein, in subsequent periods of the CG configuration, a HARQ process ID for the PUSCH transmissions is determined according the HARQ process ID determination for the first period.

3. The processor of claim 1, wherein subsequent PUSCH transmissions within the first period are incremented by 1, independent of a slot index for the subsequent PUSCH transmissions, and subsequent PUSCH transmissions in subsequent periods of the CG configuration continue to be incremented by 1, independent of a slot index for the subsequent PUSCH transmissions in the subsequent periods of the CG configuration.

4. The processor of claim 1, wherein a HARQ process ID for all of the PUSCH transmissions in the CG configuration is calculated based on the formula.

5. The processor of claim 1, wherein the CG configuration includes a sequence of repK parameters and repK-RV parameters, wherein each of the repK and repK-RV parameters corresponds to a different transport block (TB) in the single period of the CG.

6. The processor of claim 1, wherein a time domain resource allocation (TDRA) table used to determine the time domain resources for the PUSCH transmissions is included in the CG configuration.

7. The processor of claim 1, wherein the operations further comprise transmitting to the UE a further DCI for retransmissions of transport blocks (TBs) that were unsuccessfully decoded by the base station.

8. The processor of claim 7, wherein the further DCI includes a new data indicator (NDI) field set to 1 for at least one PUSCH and the UE determines, based on the NDI field set to 1, that the DCI is for retransmissions.

9. The processor of claim 8, wherein a number of start and length indicator values (SLIVs) in a time domain resource allocation (TDRA) table entry in the further DCI is equal to the maximum number of PUSCH transmissions allowed within the single period.

10. A base station, comprising:
a transceiver configured to communicate with a user equipment (UE); and
a processor communicatively coupled to the transceiver and configured to:
generate, for transmission to a user equipment (UE), a configured grant (CG) configuration for physical uplink shared channel (PUSCH) transmissions wherein multiple PUSCHs are transmitted within a single period of the CG, the CG configuration including a parameter for a number of hybrid automatic repeat request (HARQ) processes associated with the CG configuration;
generate, for transmission to the UE, a downlink control information (DCI) transmission for activating the CG configuration, the DCI including a HARQ process ID for one of the PUSCH transmissions in the CG configuration, wherein the UE determines a maximum number of PUSCH transmissions allowed within the single period based on the parameter for the number of HARQ processes associated with the CG configuration, wherein the HARQ process ID for a first one of the PUSCH transmissions in a first period of the CG configuration is determined based on a formula for calculating the HARQ process ID, wherein subsequent PUSCH transmissions within the first period are incremented by 1, independent of a slot index for the subsequent PUSCH transmissions; and
receive, from the UE, the multiple PUSCH transmissions within the single CG period.

11. The base station of claim 10, wherein, in subsequent periods of the CG configuration, a HARQ process ID for the PUSCH transmissions is determined according the HARQ process ID determination for the first period.

12. The base station of claim 10, wherein subsequent PUSCH transmissions within the first period are incremented by 1, independent of a slot index for the subsequent PUSCH transmissions, and subsequent PUSCH transmissions in subsequent periods of the CG configuration continue to be incremented by 1, independent of a slot index for the subsequent PUSCH transmissions in the subsequent periods of the CG configuration.

13. The base station of claim 10, wherein a HARQ process ID for all of the PUSCH transmissions in the CG configuration is calculated based on the formula.

14. The base station of claim 10, wherein the CG configuration includes a sequence of repK parameters and repK-RV parameters, wherein each of the repK and repK-RV parameters corresponds to a different transport block (TB) in the single period of the CG.

15. The base station of claim 10, wherein a time domain resource allocation (TDRA) table used to determine the time domain resources for the PUSCH transmissions is included in the CG configuration.

16. The base station of claim 10, wherein the operations further comprise transmitting to the UE a further DCI for retransmissions of transport blocks (TBs) that were unsuccessfully decoded by the base station.

17. The base station of claim 16, wherein the further DCI includes a new data indicator (NDI) field set to 1 for at least one PUSCH and the UE determines, based on the NDI field set to 1, that the DCI is for retransmissions.

18. The base station of claim 17, wherein a number of start and length indicator values (SLIVs) in a time domain resource allocation (TDRA) table entry in the further DCI is equal to the maximum number of PUSCH transmissions allowed within the single period.

* * * * *